(12) United States Patent
Heidan

(10) Patent No.: US 10,399,416 B2
(45) Date of Patent: Sep. 3, 2019

(54) SLIDING ROOF SYSTEM FOR A MOTOR VEHICLE

(71) Applicant: Michael Heidan, Stuttgart (DE)

(72) Inventor: Michael Heidan, Stuttgart (DE)

(73) Assignee: BOS GMBH & CO. KG, Ostfildern (DE)

(*) Notice: Subject to any disclaimer, the term of this patent is extended or adjusted under 35 U.S.C. 154(b) by 0 days.

(21) Appl. No.: 15/868,087

(22) Filed: Jan. 11, 2018

(65) Prior Publication Data
US 2018/0215242 A1    Aug. 2, 2018

(30) Foreign Application Priority Data
Jan. 30, 2017   (DE) .................. 10 2017 201 402

(51) Int. Cl.
B60J 7/043    (2006.01)
B60J 7/047    (2006.01)
B60J 7/057    (2006.01)
B60J 7/19     (2006.01)
B60J 7/02     (2006.01)

(52) U.S. Cl.
CPC ............ *B60J 7/0435* (2013.01); *B60J 7/024* (2013.01); *B60J 7/047* (2013.01); *B60J 7/0573* (2013.01); *B60J 7/192* (2013.01)

(58) Field of Classification Search
CPC ........ B60J 7/0435; B60J 7/047; B60J 7/0573; B60J 7/024; B60J 7/192

USPC .......................... 296/216.02–216.05, 220.01
See application file for complete search history.

(56) References Cited

U.S. PATENT DOCUMENTS

| 7,828,376 B2* | 11/2010 | Nellen .................. B60J 7/0435 296/216.03 |
| 8,857,903 B2* | 10/2014 | Nellen ..................... B60J 7/024 296/216.03 |
| 9,376,000 B2* | 6/2016 | Heidan ..................... B60J 7/024 |
| 9,636,980 B2* | 5/2017 | Van Boxtel ............ B60J 7/0435 |

FOREIGN PATENT DOCUMENTS

| CN | 104943516 A | 9/2015 |
| DE | 10 2012 223 709 A1 | 6/2014 |
| EP | 2 078 630 A1 | 7/2009 |
| EP | 2 554 415 A1 | 2/2013 |
| EP | 3 034 343 A1 | 6/2016 |

* cited by examiner

*Primary Examiner* — Dennis H Pedder
(74) *Attorney, Agent, or Firm* — Flynn Thiel, P.C.

(57) ABSTRACT

A sliding roof system including a support frame, a front movable roof part and a rear roof part, wherein the front roof part is shiftable between a closed position, an obliquely erected ventilation position and an open position in which the front roof part is positioned over the rear roof part. The front guide lever has a lower guide joint which is guided in a guide path, which is curved downwards on the front side, of the guide rail arrangement in such a manner that, in the ventilation position of the roof part, the guide slide is held in the guide path in a self-locking manner with respect to shifting of the control slide.

6 Claims, 5 Drawing Sheets ium Application No. 10 2017 201 402.4, filed Jan. 30, 2017, the disclosure of which is hereby incorporated by reference in its entirety.

SLIDING ROOF SYSTEM FOR A MOTOR VEHICLE

CROSS-REFERENCE TO RELATED APPLICATION

This claims priority from German Application No. 10 2017 201 402.4, filed Jan. 30, 2017, the disclosure of which is hereby incorporated by reference in its entirety.

FIELD OF THE INVENTION

The invention relates to a sliding roof system for a motor vehicle, comprising a support frame, wherein the front roof part is shiftable between a closed position, an obliquely erected ventilation position and an open position in which the front roof part is positioned over the rear roof part, and with a shifting device which is connected to the front roof part in order to shift the latter between the different positions, and which has a support strip fastened to the roof part, and also a control slide, a front guide mechanism and a rear deployment mechanism, which are movable in a guide rail arrangement of the support frame, wherein the front guide mechanism is formed by a single-part guide lever and the rear deployment mechanism is formed by a single-part deployment lever, wherein the front guide lever is coupled to the support strip.

BACKGROUND OF THE INVENTION

A sliding roof system of this type is known from DE 10 2012 223 709 A1. The known sliding roof system has a movable roof part which is shiftable between the different positions by means of a shifting device which acts on in each case one side of the roof part on a support strip. In order, despite a movement of the control slide, to obtain a guide-rail-side securing of the front guide mechanism for the roof part in the ventilation position during a deployment movement of the rear deployment mechanism, the sliding roof system has a control lever which can latch in a guide-rail-side latching recess.

SUMMARY OF THE INVENTION

It is the object of the invention to provide a sliding roof system of the type mentioned at the beginning which has a reduced number of components and in particular permits the omission of a control lever which is latchable on the guide-rail side.

This object is achieved in that the front guide lever has a lower guide joint which is guided in a guide path, which is curved downwards on the front side, of the guide rail arrangement in such a manner that, in the ventilation position of the roof part, the guide joint is held in the guide path in a self-locking manner with respect to shifting of the control slide.

For the shifting device, the solution according to the invention merely requires three components which are assigned to the respective support strip of the movable roof part, namely a front guide lever, a rear deployment lever and the control slide. The front guide lever is temporarily blocked by the guide joint of the guide lever entering the downwardly curved guide path, and therefore the front part of the support strip, and therefore of the roof part, is secured relative to the guide rail arrangement while the rear deployment lever can deploy the rear part of the support strip, and therefore also of the roof part, upwards. This results in a reduction in the number of components. In addition, in the case of the solution according to the invention, an additional control lever and also a latching recess for the control lever in the guide rail arrangement are omitted. The solution according to the invention is provided for sliding roof systems in the form of top load embodiments in which the front roof part is shiftable over and beyond the rear roof part. Owing to the fact that the shifting device has a very short construction—as seen in the longitudinal direction of the vehicle—because of the small number of components, the front roof part can be moved completely over the rear roof part in the open position, as a result of which a particularly large roof opening towards the vehicle interior is produced in the open position. The solution according to the invention is suitable in a particularly advantageous manner for use in passenger vehicles. The sliding roof system is preferably supplied preassembled and is inserted in the preassembled form into a roof cutout of the roof region of the passenger vehicle and fixed relative to the roof region by means of corresponding fastenings of the support frame.

In a refinement of the invention, the deployment lever is coupled to the support strip and is guided in a control slot of the control slide by means of a crossed double guide. The crossed double guide results in the advantageous shift ability of the rear deployment lever for transferring the support strip, and therefore the roof part, into the different positions. A respective support strip and a respective shifting device are assigned on opposite sides to the roof part, wherein the opposite shifting devices are moved synchronously with respect to each other by a drive system. The opposite shifting devices are designed identically to each other, but mirror-symmetrically to a vertical vehicle centre longitudinal plane—with respect to the mounted state of the sliding roof system.

In a further refinement of the invention, the guide lever is guided in two different guide slots of the control slide via two points of articulation. The two guide slots are spaced apart from each other in the vertical direction of the control slide and bring about the guidance and control of the guide lever during the shifting into the different positions of the movable roof part, in each case in operative connection with the guide joint of the guide lever.

In a further refinement of the invention, the guide path for the guide joint subsequent to the curved front region runs parallel above a main guide path of the guide rail arrangement for the control slide. Accordingly, the guide path for the guide joint is separate from the main guide path for the control slide. This facilitates the shifting of the movable roof part between the ventilation position and the open position.

In a further refinement of the invention, the crossed double guide of the control slot is formed on the control slide by a slot track which has a rearwardly and upwardly rising front slot portion and a rearwardly and downwardly dropping rear slot portion, which slot portions merge into each other in an aligned manner in the region of an upper apex point. This results in the crossed double guide being able to be produced in a simple manner. The deployment lever has two points of articulation, of which a front one is assigned to the front slot portion and a rear one to the rear slot portion in order to be guided in the slot portions in the manner of sliding blocks.

In a further refinement of the invention, the control slide has a single-part web body which is oriented on end and in which the two guide slots and the control slot are integrated. The web body is composed of metal. The two guide slots and the control slots are designed as passage slots in the web body, and therefore corresponding sliding blocks of the points of articulation of the rear deployment lever and of the points of articulation of the front guide lever project through the corresponding passage slots and are secured against release transversely with respect to the shifting direction.

Further advantages and features of the invention emerge from the claims and from the description below of a preferred exemplary embodiment of the invention that is illustrated with reference to the drawings.

DETAILED DESCRIPTION

A sliding roof system 1 according to FIGS. 1 to 11 is provided for use in a passenger vehicle. The sliding roof system 1 has a support frame 2 which, for mounting on the passenger vehicle, is fixedly connected to a border region of a roof cutout of a roof region of the passenger vehicle. The support frame 2 is of substantially rectangular design and has two opposite longitudinal sides 3 which, in the state mounted on the vehicle, are extended in the longitudinal direction of the vehicle. In addition, the support frame 2 has a front side which extends in the transverse direction of the vehicle between the two longitudinal sides 3. The two longitudinal sides 3 are also connected to each other on the rear side via a rear side of the support frame 2.

Figure 1:
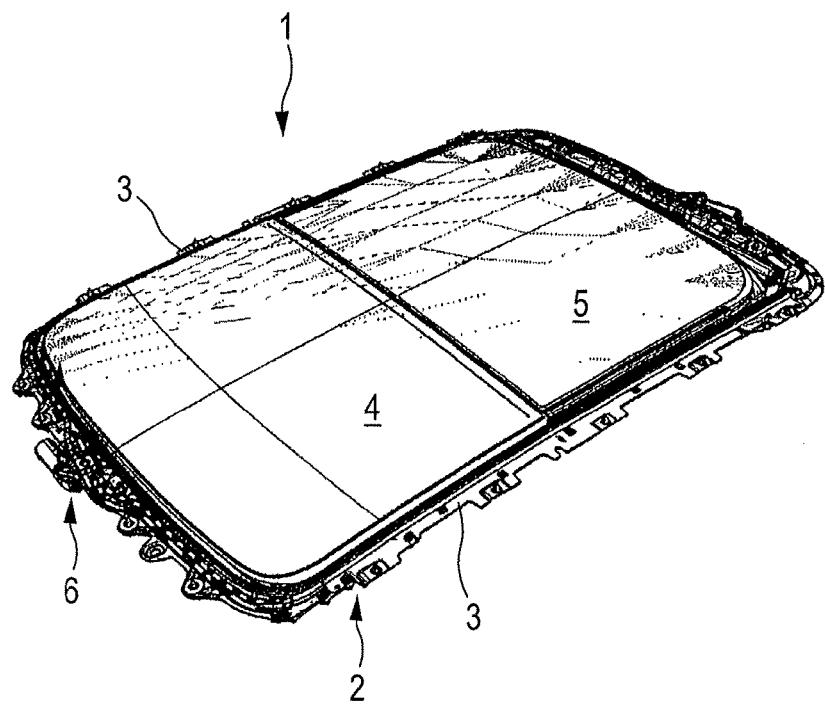
FIG. 1 shows, in a perspective illustration, an embodiment of a sliding roof system according to the invention for a passenger vehicle, in a closed position.
Figure 2:
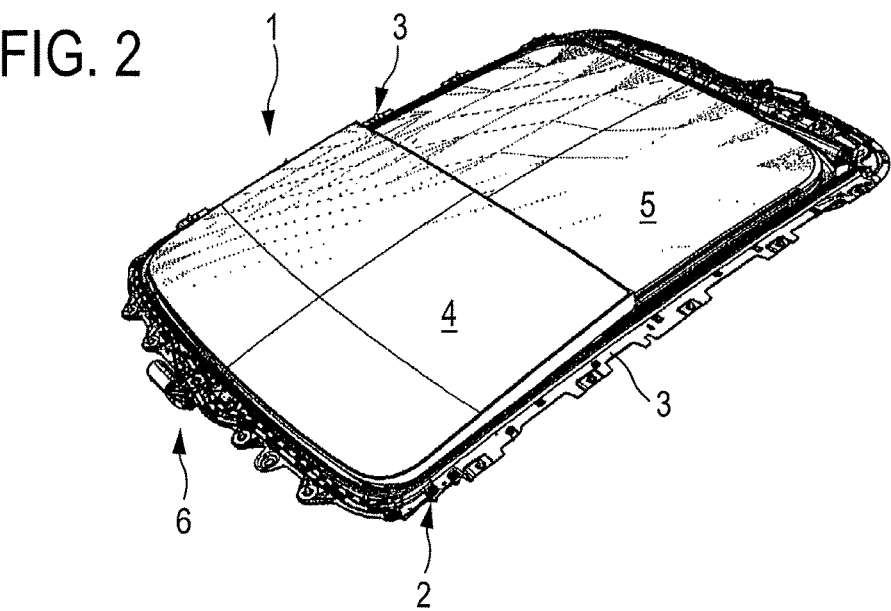
FIG. 2 shows the sliding roof system according to FIG. 1 in a ventilation position.
Figure 3:
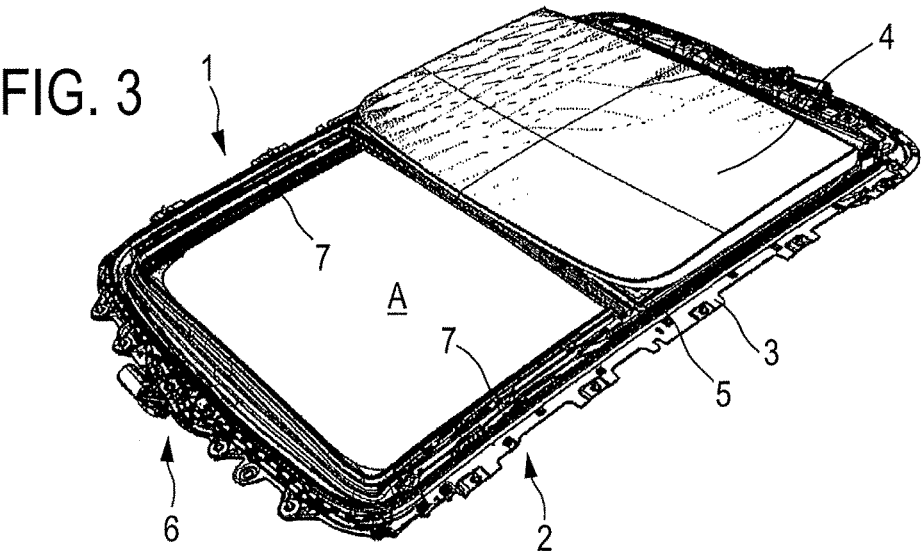
FIG. 3 shows the sliding roof system according to FIGS. 1 and 2 in an open position.

The frame 2 supports a front movable roof part 4 and a rear roof part 5 which is fixedly connected to the support frame and, in the mounted state of the sliding roof system 1, is positioned rigidly and therefore fixed to the vehicle. Both the front roof part 4 and the rear roof part 5 are produced from a transparent material, preferably from a laminated glass. The front roof part 4 is shiftable in the vertical direction and also in the longitudinal direction between a closed position (FIGS. 1 and 4), a ventilation position (FIGS. 2 and 5) and an open position (FIG. 3). In the ventilation position, the roof part 4 is positioned obliquely upwards, as a result of which a rear edge of the roof part 4 projects beyond an upper side of the rigid roof part 5. In the open position, the movable roof part 4 is moved to the rear beyond the rigid roof part 5 and opens up a roof opening A which, in the mounted state of the sliding roof system 1, is open towards a vehicle interior.

In order to be able to shift the roof part 4 between the closed position and the open position, a respective shifting device 7, which is described in more detail below, is assigned to the roof part 4 in the region of each longitudinal side 3 of the support frame 2. In the region of each longitudinal side 3, the shifting device 7 has a plurality of functional parts (described in more detail below) which are guided in a guide rail arrangement 8 of each longitudinal side 3 of the support frame 2. The shifting devices 7 which are provided in the opposite longitudinal sides 3 are formed in a mirror-symmetrical manner relative to a vertical centre longitudinal plane, but otherwise identically to each other. The guide rail arrangement in the region of each longitudinal side 3 is also arranged identically to the opposite guide rail arrangement 8, in a correspondingly mirror-symmetrical orientation relative to the vertical centre longitudinal plane. A drive system 6 is provided for shifting the movable roof part 4 and for controlling the functional parts of the shifting device 7, said drive system having two drive cables which are each connected to a shifting device 7 and which are driven synchronously with respect to each other via an electric drive motor and a gearing. The drive cables are guided along the respective guide rail arrangement 8 and in each case drive a functional part in the form of a control slide 15 of the shifting device 7. Each drive cable is shifted in the longitudinal direction along the guide rail arrangement 8 and thus carries along the respective control slide 15.

The construction and function of the shifting device 7 are described below with reference to the left shifting device—as seen in the direction of travel of the passenger vehicle—which is illustrated in FIGS. 4 to 11. The opposite shifting device 7 is identical in terms of construction and function. The corresponding functional parts of the right shifting device 7 are designed and arranged merely mirror-symmetrically.

A support strip 12 is fastened to a side region of the movable roof part 4 via a plurality of screw connections arranged distributed over the length of the support strip 12. A guide lever 13 is coupled pivotably via a point of articulation 19 to a front end region of the support strip 12. The point of articulation 19 has a pivot axis extending in the transverse direction, as do all the pivot joints described below. In addition, a rear deployment lever 14 acts on the support strip 12 behind a centre of the support strip 12, but in front of a rear end region of the support strip 12, via a point of articulation 22 designed as a pivot joint. The support strip 12 is shifted in the vertical direction and in the longitudinal direction by means of the front guide lever 13 and the rear deployment lever 14, thus resulting in the desired shifting of the roof part 4. The control slide 15 is provided for controlling the guide lever 13 and the deployment lever 14, the control slide having a web body 18 oriented on end and in the longitudinal direction, and a front guide slider 17 and a rear guide slider 29. The two guide sliders 17 and 29 and therefore also the control slide 15 are guided slidably in the longitudinal direction in a main guide path 9 of the guide rail arrangement 8. The guide sliders 17 and 29 are fixedly connected to the web body 18 of the control slide 15.

A lower side of the front guide lever 13 is provided, at a distance from the point of articulation 19, with a guide joint 16 which is guided in an upper guide path 10 of the guide rail arrangement 8. At a front end, the upper guide path 10 has a front region 11 which is curved in an arcuate manner downwards and projects until below a plane of the main guide path 9. The guide joint 16 is provided with corresponding sliding pins which enable the guide joint 16 to slide in the upper guide path 10 and in the curved front region 11.

The guide lever 13 also has a rearwardly projecting extension arm portion which is guided via two further points of articulation 20, 21 and two guide slots 25 and 26 of the web body 18 of the control slide 15 in the manner of a sliding block in each case. The upper guide slot 25 extends rectilinearly in the longitudinal direction while the lower guide slot 26 is curved in an arcuate manner upwards in a front region.

The rear deployment lever 14 is held and guided in a crossed control slot of the web body 18 of the control slide 15 via two points of articulation 22, 24, wherein the two points of articulation 23, 24 are likewise designed in the manner of sliding blocks. The control slot forms a double guide within the context of the invention. The crossed control slot has a slot track with a front slot portion 27 and a rear slot portion 28, which slot portions merge into each other in an aligned manner. The control slot 27, 28 and the guide slots 25, 26 are designed as passage slots in the web body 18. All of the points of articulation 20, 21 and 23, 24 are guided in a longitudinally displaceable manner in the corresponding passage slots and are secured in a form-fitting manner in the transverse direction.

The control slot 27, 28 has a front slot portion 27 which, starting from a lower plane which lies level with the plane of the guide slot 26, rises obliquely rearwards and upwards. At an apex point, the front slot portion 27 merges into a rear slot portion 28 which, starting from the apex point, drops downwards and rearwards in an undulating form and ends level with the lower plane of the front slot portion 27. The point of articulation 23 of the deployment lever 14 is movable in a slidable manner along the front slot portion 27, whereas the point of articulation 24 is shiftable in a slidable manner in the rear slot portion 28. Accordingly, the deployment lever 14 is supported exclusively on the control slide 15, namely with a lower extension region via the two points of articulation 23, 24, while an upper extension arm region extending obliquely upwards and rearwards acts on the carrier strip 12 by means of the point of articulation 22 on the front end side.

Shifting of the control slide 15 in the guide rail arrangement 8 rearwards or forwards in the longitudinal direction via the drive of the respective drive cable leads to the desired shifting of the movable roof part 4 between the closed position and the open position.

Figure 4:
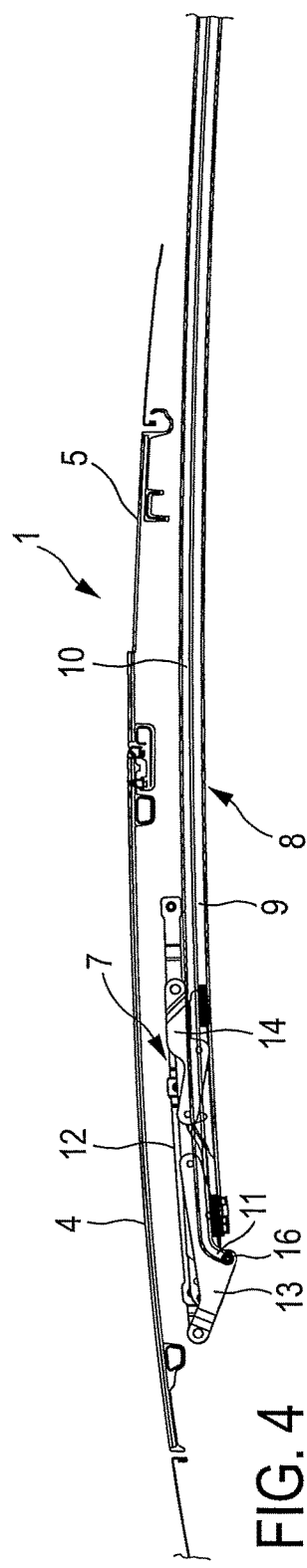
FIGS. 4 to 6 show, in longitudinal sectional illustrations, the different positions of the sliding roof system according to FIGS. 1 to 3 with a shifting device for shifting a movable roof part into the different positions.
Figure 5:
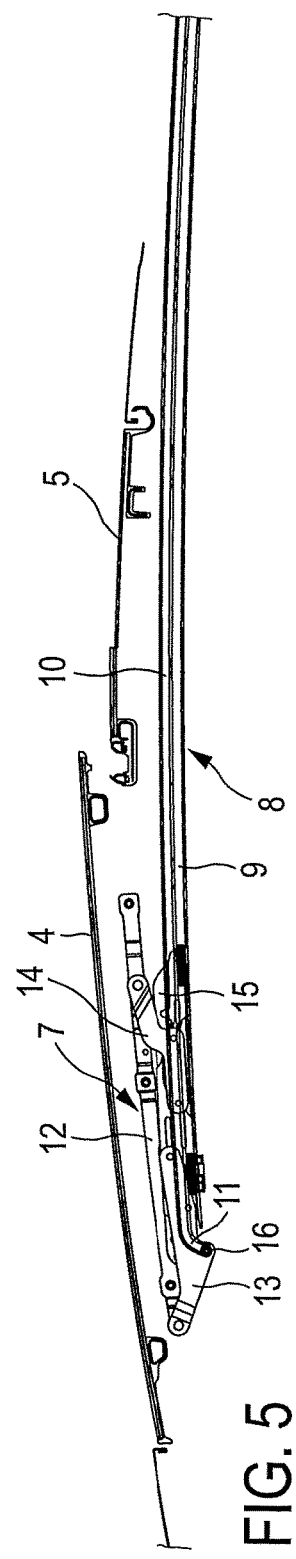
Figure 6:
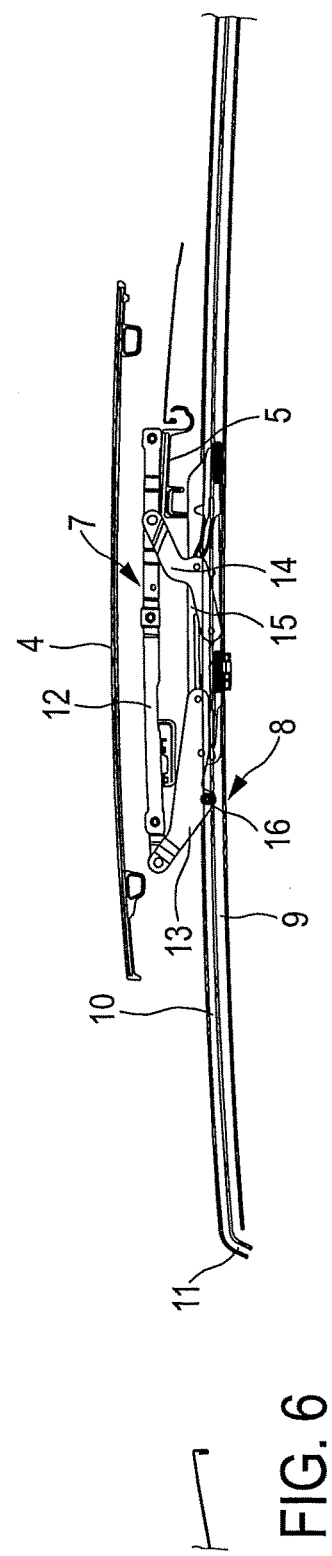
Figure 7:
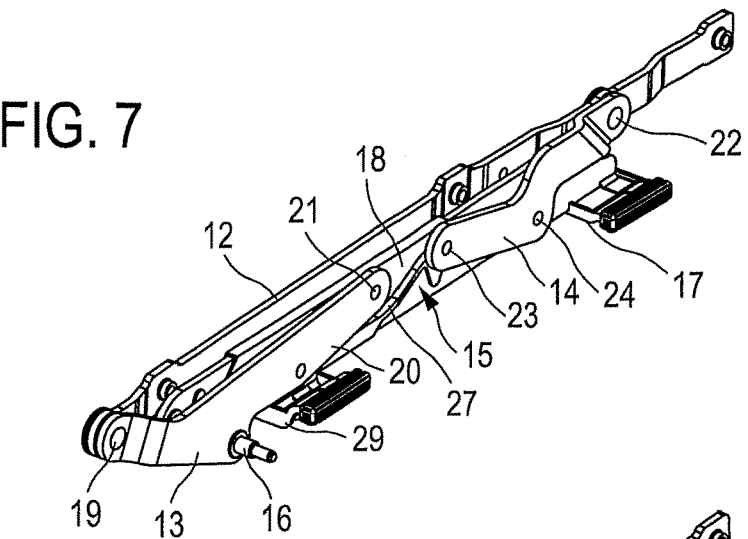
FIG. 7 shows, in a perspective illustration, the shifting device according to FIGS. 4 to 6 in a closed position of the movable roof part.
Figure 8:
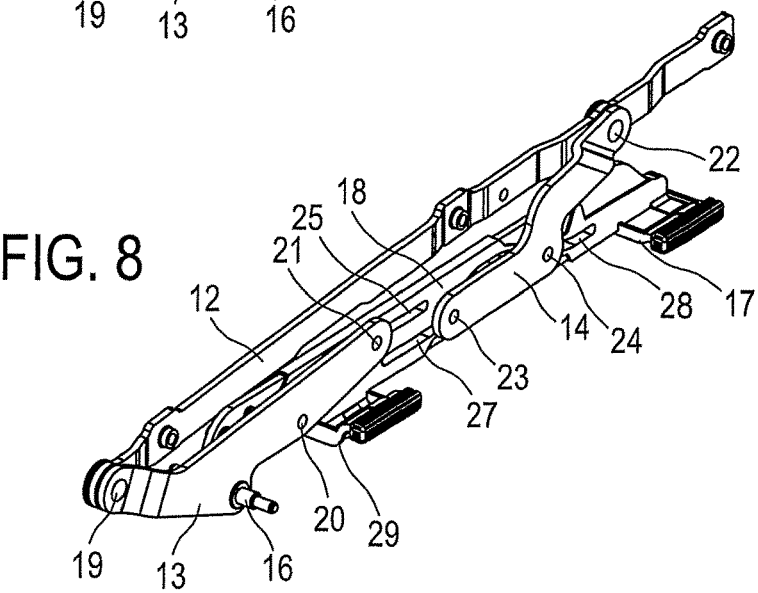
FIG. 8 shows the shifting device according to FIG. 7 in a ventilation position of the movable roof part.
Figure 9:
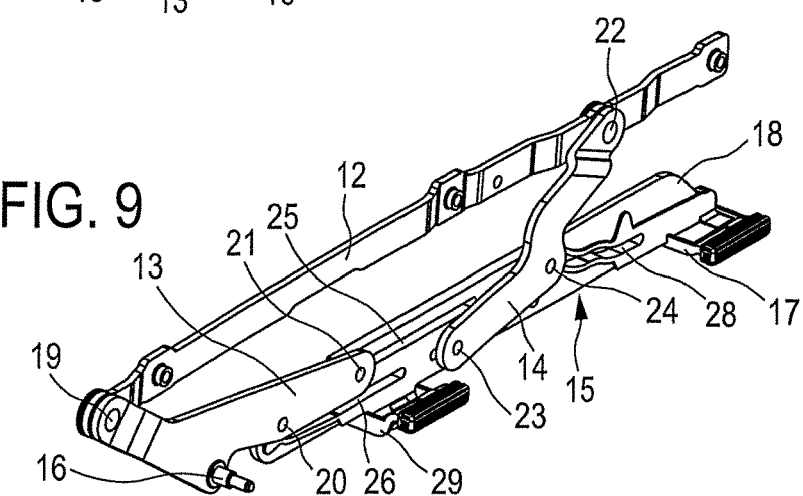
FIG. 9 shows the shifting device according to FIGS. 7 and 8 in an open position of the movable roof part.
Figure 10:
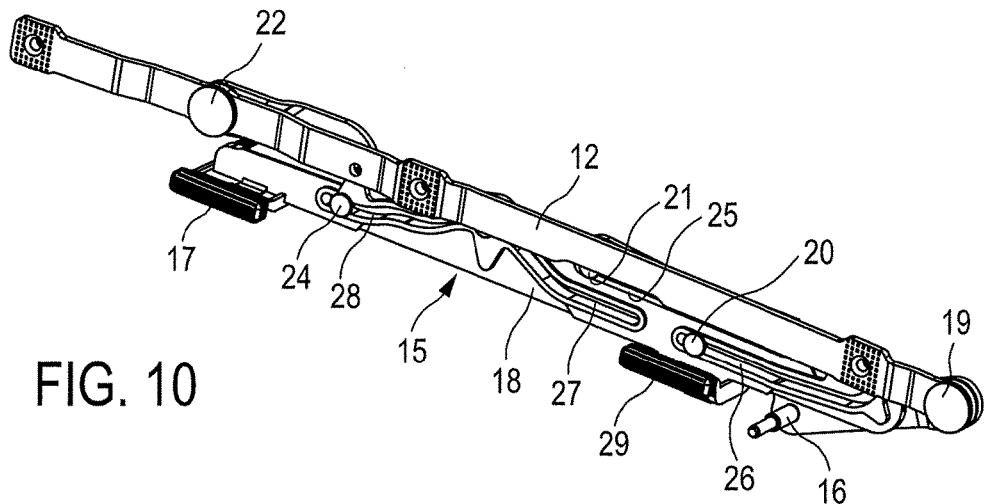
FIG. 10 shows the shifting device according to FIG. 7 in a different perspective illustration.
Figure 11:
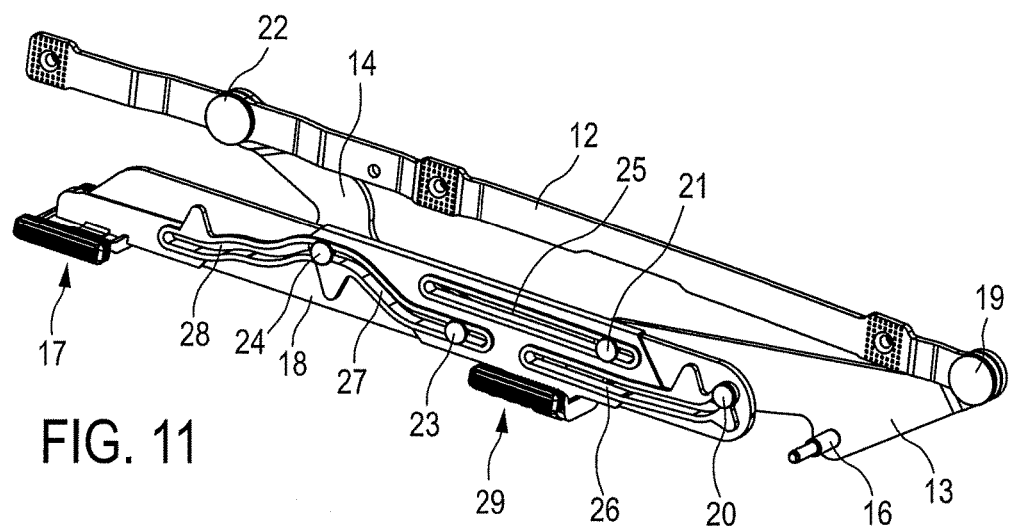
FIG. 11 shows the shifting device according to FIG. 9 in a different perspective illustration.

As can be seen with reference to FIG. 4, the control slide 15 is in a front end position in the closed position of the roof part 4. In order to be able to deploy the roof part 4 obliquely upward from the closed position into the ventilation position, the control slide 15 is moved rearwards, as a result of which, because of the movement of the points of articulation 23 and 24 along the crossed control slot 27, 28, the deployment lever 14 is inevitably tilted and is shifted upwards by its rear extension arm portion. At the same time, the front guide joint 16 of the guide lever 13 remains trapped in a lower end position of the curved front portion 11 of the upper guide path 10, and therefore the roof part 4 is no longer shifted rearwards in the longitudinal direction, but rather is merely lowered slightly downwards in the direction of its front border edge and is deployed upwards in the region of its rear border edge beyond the upper side of the rigid roof part 5.

By further movement of the control slide 15 rearwards in the longitudinal direction in the main guide path 9, the guide joint 16 of the front guide lever 13 is lifted out of the curved front portion 11, as a result of which the guide joint 16 is inevitably shifted upwards and rearwards and slides rearwards in the upper guide path 10 above the main guide path 9. At the same time, the shifting of the control slide 15 rearwards brings about the complete deployment of the deployment lever 14, as a result of which the roof part 4 is raised in the vertical direction both in the front and rear sides beyond the upper side of the rigid roof part 5, and therefore the roof part 4 can be shifted beyond the roof part 5 above the roof part 5. The two shifting devices 7 each slide laterally past the rigid roof part 5. As soon as the roof part 4 has reached the open position according to FIG. 3, the control slide 15 has also reached its rear end position. In order to move the roof part 4 again from the open position in the direction of the closed position, the control slide 15 is moved again in the opposite direction in a simple manner.

The crossed double guide has retained its name since an imaginary line between the two points of articulation 23 and 24 in the closed position of the roof part 4 crosses a further imaginary line between the two points of articulation 23 and 24 in the open position of the roof part 4, and therefore the support portion, which supports the points of articulation 23, 24, of the deployment lever 14 is tilted forwards within the crossed double guide in a front end position and is tilted obliquely rearwards in the crossed double guide in a rear end position.

The invention claimed is:

1. Sliding roof system for a motor vehicle, comprising a support frame and comprising a front movable roof part and a rear roof part, wherein the front movable roof part is shiftable between a closed position, an obliquely erected ventilation position and an open position in which the front movable roof part is positioned over the rear roof part, and with a shifting device which is connected to the front movable roof part in order to shift the front movable roof part between the different positions, and the shifting device having a support strip fastened to the front movable roof part, and the shifting device also having a control slide, a front guide mechanism and a rear deployment mechanism which are movable in a guide rail arrangement of the support frame, wherein the front guide mechanism is formed by a single-part front guide lever and the rear deployment mechanism is formed by a single-part deployment lever, wherein the front guide lever is coupled to the support strip, wherein the front guide lever has a lower guide joint which is guided in a guide path which is curved downwards on the front side of the guide rail arrangement in such a manner that, in the ventilation position of the front movable roof part, the lower guide joint is held in the guide path in a self-locking manner with respect to shifting of the control slide; and wherein the deployment lever is coupled to the support strip and is guided in a control slot of the control slide by a crossed double guide.

2. Sliding roof system according to claim 1, wherein the front guide lever is guided in two different guide slots of the control slide via two points of articulation.

3. Sliding roof system for a motor vehicle, comprising a support frame and comprising a front movable roof part and a rear roof part, wherein the front movable roof part is shiftable between a closed position, an obliquely erected ventilation position and an open position in which the front movable roof part is positioned over the rear roof part, and with a shifting device which is connected to the front movable roof part in order to shift the front movable roof part between the different positions, and the shifting device having a support strip fastened to the front movable roof part, and the shifting device also having a control slide, a front guide mechanism and a rear deployment mechanism which are movable in a guide rail arrangement of the support frame, wherein the front guide mechanism is formed by a single-part front guide lever and the rear deployment mechanism is formed by a single-part deployment lever, wherein the front guide lever is coupled to the support strip, wherein the front guide lever has a lower guide joint which is guided in a guide path which is curved downwards on the front side of the guide rail arrangement in such a manner that, in the ventilation position of the front movable roof part, the lower guide joint is held in the guide path in a self-locking manner with respect to shifting of the control slide; and wherein the guide path for the guide joint subsequent to the front side of the guide path which is curved downward runs parallel above a main guide path of the guide rail arrangement for the control slide.

4. Sliding roof system according to claim 2, wherein the crossed double guide is formed on the control slide by a slot track which has a rearwardly and upwardly rising front slot portion and a rearwardly and downwardly dropping rear slot portion, which slot portions merge into each other in an aligned manner in the region of an upper apex point.

5. Sliding roof system according to claim 2, wherein the control slide has a single-part web body which is oriented on end and in which the two guide slots and the control slot are integrated.

6. Sliding roof system for a motor vehicle, comprising a support frame and comprising a front movable roof part and a rear roof part, wherein the front movable roof part is shiftable between a closed position, an obliquely erected ventilation position and an open position in which the front movable roof part is positioned over the rear roof part, and with a shifting device which is connected to the front movable roof part in order to shift the front movable roof part between the different positions, and the shifting device having a support strip fastened to the front movable roof part, and the shifting device also having a control slide, a front guide mechanism and a rear deployment mechanism which are movable in a guide rail arrangement of the support frame, wherein the front guide mechanism is formed by a single-part front guide lever and the rear deployment mechanism is formed by a single-part deployment lever, wherein the front guide lever is coupled to the support strip, wherein the front guide lever has a lower guide joint which is guided in a guide path which is curved downwards on the front side of the guide rail arrangement in such a manner that, in the ventilation position of the front movable roof part, the lower guide joint is held in the guide path in a self-locking manner with respect to shifting of the control slide; and wherein the front guide lever is guided in two different guide slots of the control slide via two points of articulation.

* * * * *